(No Model.)  5 Sheets—Sheet 1.
C. H. PUGH.
METHOD OF MANUFACTURING METALLIC RIMS FOR BICYCLE WHEELS.
No. 527,345. Patented Oct. 9, 1894.
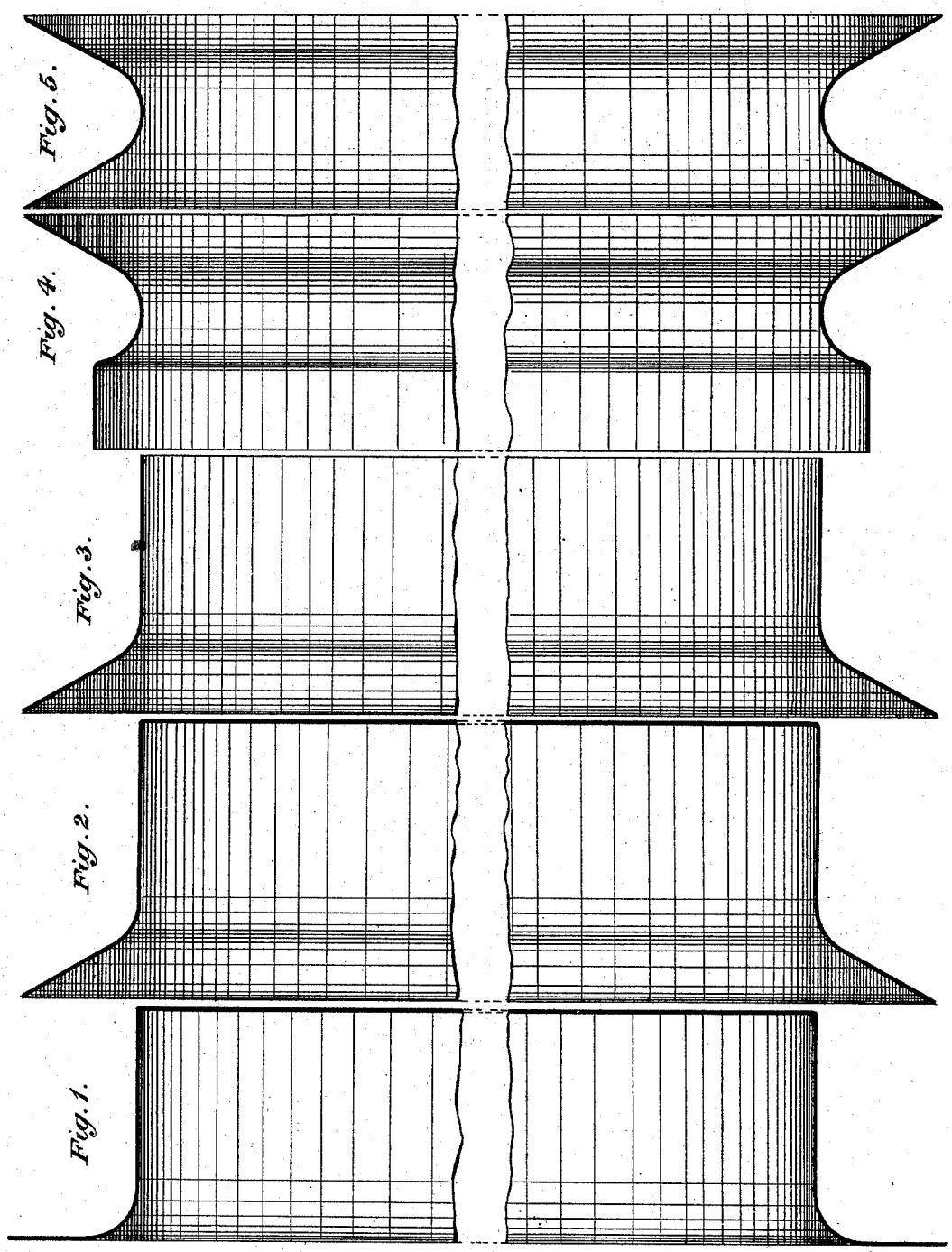

(No Model.)  C. H. PUGH.  5 Sheets—Sheet 2.
METHOD OF MANUFACTURING METALLIC RIMS FOR BICYCLE WHEELS.
No. 527,345.  Patented Oct. 9, 1894.
Fig. 6.
Fig. 7.
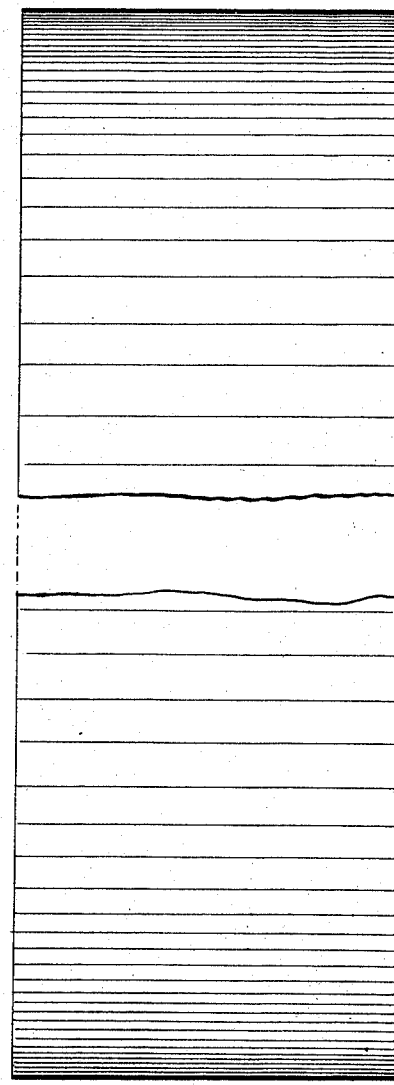
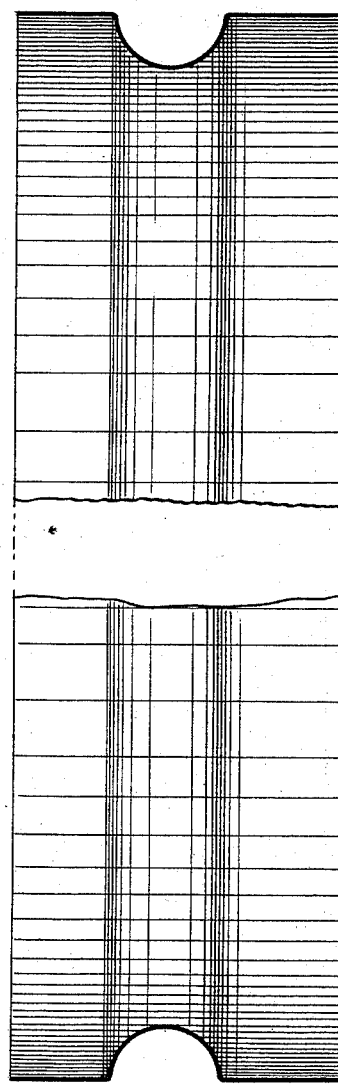
Witnesses:—
George Shaw
Richard Skerrett
Inventor:—
Charles Henry Pugh (No Model.) 5 Sheets—Sheet 3.
C. H. PUGH.
METHOD OF MANUFACTURING METALLIC RIMS FOR BICYCLE WHEELS.
No. 527,345. Patented Oct. 9, 1894.

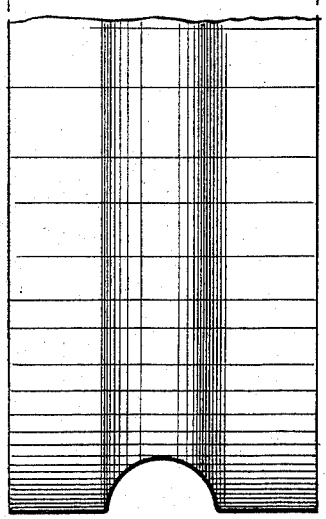
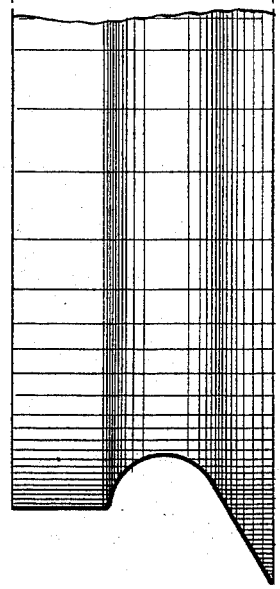
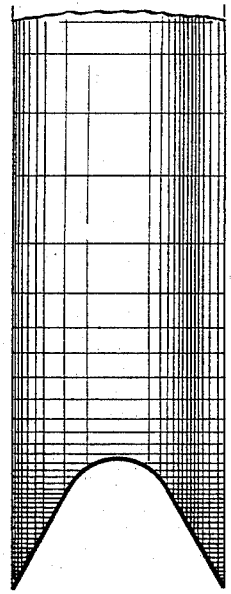

(No Model.) 5 Sheets—Sheet 4.

C. H. PUGH.
METHOD OF MANUFACTURING METALLIC RIMS FOR BICYCLE WHEELS.

No. 527,345. Patented Oct. 9, 1894.

Witnesses:—
George Shaw
Richard Skerrett

Inventor:—
Charles Henry Pugh (No Model.) 5 Sheets—Sheet 5.

C. H. PUGH.
METHOD OF MANUFACTURING METALLIC RIMS FOR BICYCLE WHEELS.

No. 527,345. Patented Oct. 9, 1894.

Witnesses:—
George Shaw
Richard Skerrett

Inventor:—
Charles Henry Pugh

UNITED STATES PATENT OFFICE.

CHARLES HENRY PUGH, OF BIRMINGHAM, ENGLAND.

METHOD OF MANUFACTURING METALLIC RIMS FOR BICYCLE-WHEELS.

SPECIFICATION forming part of Letters Patent No. 527,345, dated October 9, 1894.

Application filed May 28, 1894. Serial No. 512,788. (No specimens.) Patented in England June 13, 1891, No. 10,076, and December 5, 1891, No. 21,284; in Germany September 3, 1892, No. 72,850; in France September 7, 1892, No. 224,205, and in Belgium September 8, 1892, No. 101,316.

*To all whom it may concern:*

Be it known that I, CHARLES HENRY PUGH, a subject of the Queen of Great Britain, residing at Birmingham, England, have invented certain new and useful Improvements in Methods of Manufacturing Metallic Rims for Bicycle-Wheels, &c., (for which I have obtained Letters Patent of Great Britain, No. 10,076, dated June 13, 1891, and No. 21,284, dated December 5, 1891; of Germany, No. 72,850, dated September 3, 1892; of France, No. 224,205, dated September 7, 1892, and of Belgium, No. 101,316, dated September 8, 1892;) and I do hereby declare that the following is a full, clear, and exact description of the invention, which will enable others skilled in the art to which it appertains to make and use the same.

My invention consists of the process or combination of processes hereinafter described whereby junctionless or unbrazed rims for the wheels of bicycles, tricycles and other velocipedes and wheel carriages are made from sheet iron or steel or other hard and ductile metal or alloy. According to my invention I make each of the said metallic rims from one or two junctionless or unbrazed hoops or rings obtained in the manner hereinafter described.

I will hereinafter refer to the rims made from one junctionless hoop or ring as solid rims and to the rims made from two junctionless or unbrazed hoops or rings as hollow or tubular rims.

Figure 15:
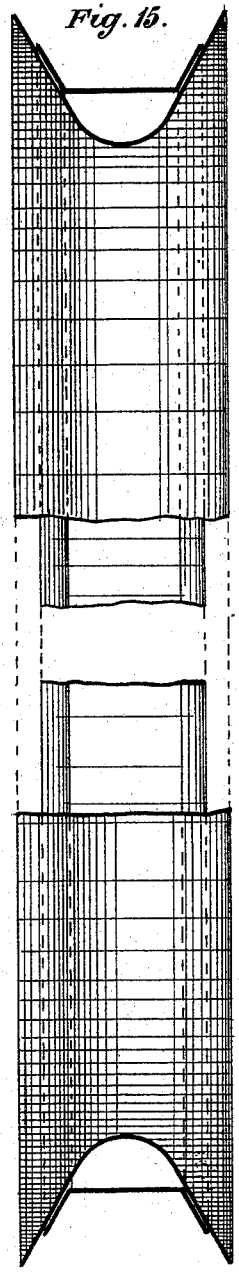
Figure 16:
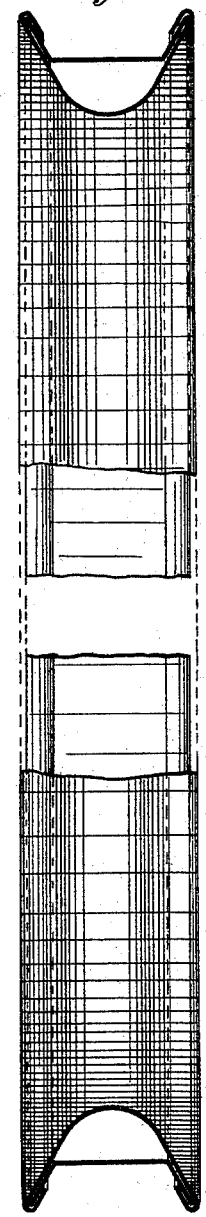

Figures 1 to 5 both inclusive of the accompanying drawings represent the stages or steps of the process by which I produce a junctionless or unbrazed solid rim or hoop and Figs. 6 to 10 both inclusive represent the stages or steps of a modified process by which I produce a junctionless or unbrazed solid rim or hoop. Figs. 11 to 14 represent the stages or steps of the process by which I produce a junctionless or unbrazed hoop of an angular figure in cross section to be used in the production of a hollow or tubular rim. Fig. 15 represents in cross section a partly made hollow or tubular rim and Fig. 16 represents in cross section a finished hollow or tubular rim.

In carrying my invention into effect I raise by a stamping or drawing through process from a circular metallic dish of sheet metal a flanged or unflanged shallow dish of the kinds represented in cross section respectively in Figs. 1 and 6.

When I take a flanged shallow dish Fig. 1, I proceed in the following manner. I trim the edge of the flange of the dish so as to make the same truly circular and turn back the said flange by spinning to the angle desired as represented in the cross section Fig. 2; or I may give the flange the inclination represented in Fig. 2 by the pressing or drawing through operation, but I prefer to proceed in the way described. I next remove or cut away the bottom of the dish and thereby obtain the flanged hoop represented in cross section in Fig. 3. I then form by rolling the bottom of the groove or trough of the rim or troughed hoop to be produced as represented in the cross section Fig. 4, and by a subsequent spinning operation expand the cylindrical portion of the hoop so as to complete the trough as represented in the cross section Fig. 5. The troughed hoop, Fig. 5, is planished or hardened by rolling or spinning.

When it is desired to form a solid rim from the junctionless or unbrazed troughed hoop, Fig. 5, it is only necessary to bead or fold the edges of the said troughed hoop by the ordinary beading operations so that the finished rim shall have rounded or uncutting edges.

Figure 8:
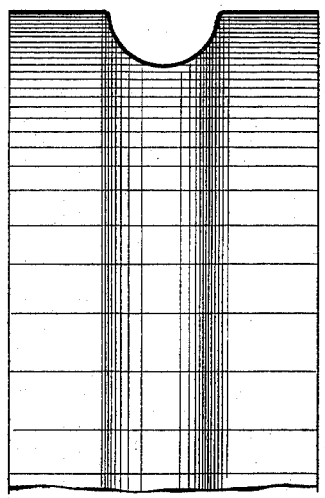
Figure 9:
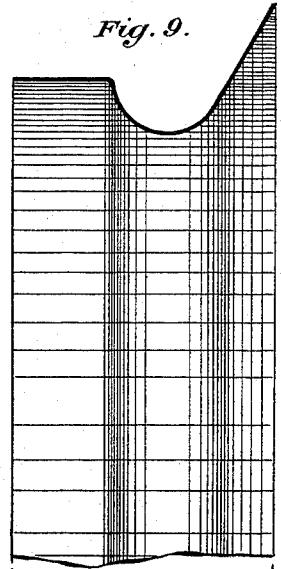

When I take an unflanged dish of the kind represented in Fig. 6, I first trim the edge of the said dish so as to remove any irregularity thereon and then proceed in the following manner: I form in the cylindrical portion of the dish by rolling or spinning an annular groove as represented in the cross section Fig. 7. The grooved hoop represented in cross section in Fig. 8 is then cut from the shallow dish by removing or cutting away the bottom of the said dish and subsequently by spinning operations applied to the interior of the hoop its opposite edges are successively brought into the form represented in cross section in Figs. 9 and 10 respectively so as to produce the nearly finished rim represented in the said Fig. 10, the said rim being completed or finished by the beading operation hereinbefore referred to.

Figure 10:
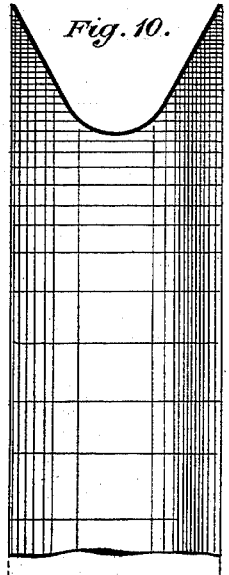

In making hollow or tubular junctionless or unbrazed rims I take two troughed hoops of the kind represented in Figs. 5 and 10 and made in the way hereinbefore described, one of the two hoops being considerably broader than the other and with an internal diameter slightly less than the other. The hoop of larger diameter constitutes in the finished hollow rim the trough in which the tire is situated and is hereinafter referred to as the tread hoop. The other hoop of smaller diameter but greater width constitutes in the finished hollow rim that part in which the spokes are fixed and is hereinafter referred to as the spoke hoop. The spoke hoop is inserted in the tread hoop and the two hoops are brought by a rolling or spinning operation into their proper relative positions. By further spinning operations the edges of the spoke hoop are turned over the edges of the tread hoop and the two hoops are thereby engaged together as will be understood by reference to Figs. 15 and 16.

When the junctionless or unbrazed troughed hoops Figs. 5 and 10 are to be employed as spoke hoops in the manufacture of hollow or tubular rims the edges of the said hoops are separated to a greater extent than in the finished rims in order to facilitate the introduction of the spoke hoop into the tread hoop.

Figure 11:
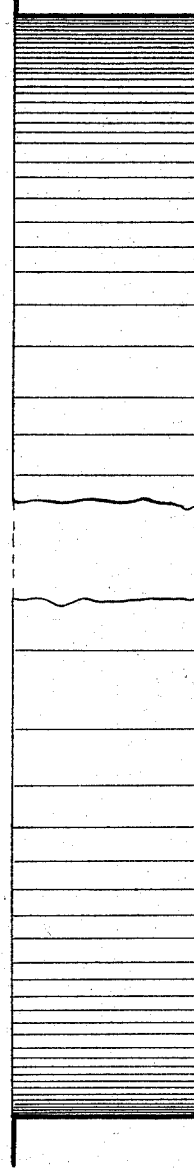
Figure 12:
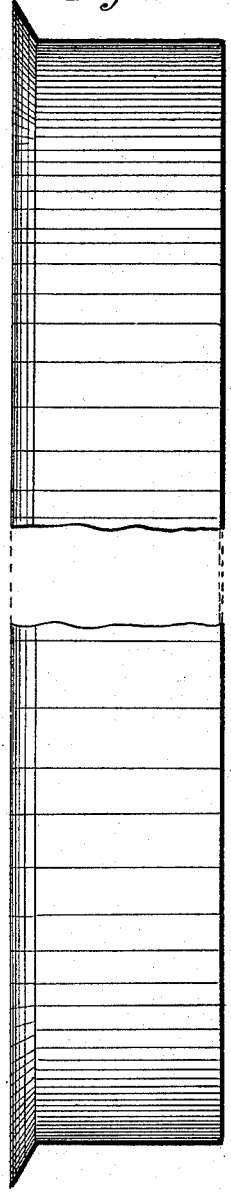
Figure 13:
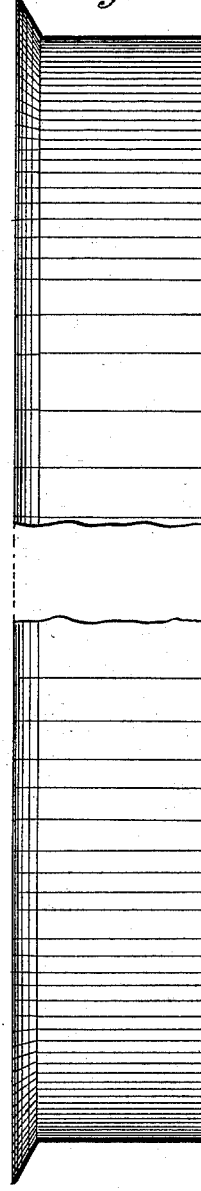
Figure 14:
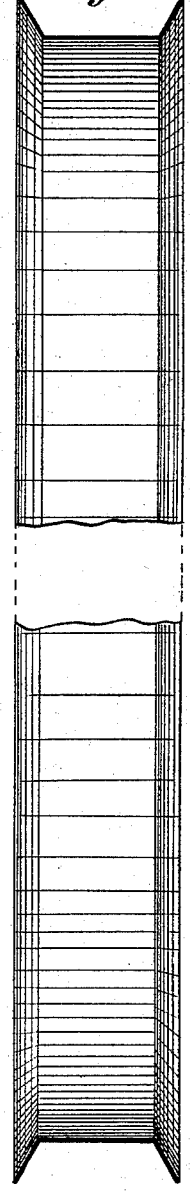

When the tread hoop is to have an angular figure in cross section as represented in the partly made rim Fig. 15 and in the finished rim Fig. 16 instead of a concave figure in cross section I form by a stamping or drawing through operation the flanged dish Fig. 11, and after trimming the edge of the flanged dish the said flange is inclined outward as represented in Fig. 12. The bottom of the said dish Fig. 12 is next cut away so as to obtain the flanged hoop Fig. 13 and by a subsequent internal rolling or internal spinning operation the cylindrical edge of the hoop Fig. 13 is flanged so as to give to the rim the desired angular figure represented in the cross section Fig. 14. The hoops employed in making the hollow or tubular rim Fig. 16, are engaged together in the way hereinbefore described with reference to the engaging of two concave troughed hoops.

Instead of the spoke hoop being of much greater width than the tread hoop as hereinbefore described the said tread hoop may be made of greater width than the spoke hoop the edges of the tread hoop in this case being turned over the edges of the spoke hoop.

The engaged hoops constituting the junctionless or unbrazed hollow or tubular rim hereinbefore described are firmly secured together by the process of soldering or riveting.

Having now described my invention, what I claim as new, and desire to secure by Letters Patent, is—

1. The process of manufacturing junctionless or unbrazed metallic wheel rims or hoops for the wheels of bicycles, tricycles and other velocipedes and wheel carriages, the said process consisting in forming a shallow dish from a disk of sheet metal or alloy, cutting away the bottom of said dish and forming in the cylindrical portion an annular groove, and finally expanding the ends of the said cylinder to form the flanged sides of the wheel rim or hoop, substantially as described.

2. The process of manufacturing junctionless or unbrazed metallic rims or hoops for the wheels of bicycles tricycles and other velocipedes and wheel carriages, the said process consisting in first forming from a disk of sheet metal or alloy a flanged shallow dish, then by a spinning operation turning the flange of the said dish back to the inclination which the sides of the trough of the rim are to have, next cutting away the bottom of the dish so as to obtain a hoop flanged at one side or end, next by internal rolling forming the curved bottom of the trough of the rim to be produced and by internal spinning forming the other side of the trough of the wheel rim or hoop substantially as described.

3. The process of manufacturing junctionless or unbrazed hollow or tubular metallic rims for the wheels of bicycles, tricycles and other velocipedes and wheel carriages, the said process consisting in forming shallow dishes from disks of sheet metal or alloy, cutting away the bottoms of said dishes and forming the cylindrical portions into flanged and trough shaped hoops, and finally introducing one of said trough shaped hoops into another trough shaped hoop of larger diameter and engaging the two hoops together by turning the edges of one over the edges of the other, substantially as described.

CHARLES HENRY PUGH. [L. S.]

Witnesses:
GEORGE SHAW,
RICHARD SKERRETT.